(12) United States Patent
Vanderlee

(10) Patent No.: US 9,837,109 B1
(45) Date of Patent: Dec. 5, 2017

(54) DISK DRIVE SUSPENSION HAVING STAMPED BASE PLATE DISTAL TIP

(71) Applicant: Magnecomp Corporation, Murrieta, CA (US)

(72) Inventor: Keith A. Vanderlee, Austin, TX (US)

(73) Assignee: Magnecomp Corporation, Murrieta, CA (US)

( * ) Notice: Subject to any disclaimer, the term of this patent is extended or adjusted under 35 U.S.C. 154(b) by 0 days.

(21) Appl. No.: 15/134,232

(22) Filed: Apr. 20, 2016

Related U.S. Application Data

(60) Provisional application No. 62/152,930, filed on Apr. 26, 2015.

(51) Int. Cl.
*G11B 5/48* (2006.01)

(52) U.S. Cl.
CPC .................. *G11B 5/4833* (2013.01)

(58) Field of Classification Search
CPC ................ G11B 5/48; G11B 5/4833
USPC ........................................... 360/244.5
See application file for complete search history.

(56) References Cited

U.S. PATENT DOCUMENTS

| | | | |
|---|---|---|---|
| 5,812,343 A | 9/1998 | Budde et al. | |
| 5,896,245 A | 4/1999 | Aoyagi et al. | |
| 5,936,803 A * | 8/1999 | Berding | G11B 5/56 360/244.8 |
| 6,063,508 A * | 5/2000 | Hanrahan | G11B 21/21 29/603.04 |
| 7,177,119 B1 * | 2/2007 | Bennin | G11B 5/4833 360/294.6 |
| 7,408,743 B1 | 8/2008 | McCaslin et al. | |
| 7,420,772 B1 | 9/2008 | Mei | |
| 7,542,239 B2 | 6/2009 | Resh et al. | |
| 7,595,965 B1 | 9/2009 | Kulangara et al. | |
| 7,907,367 B1 | 3/2011 | Chocholaty et al. | |
| 8,213,110 B1 | 7/2012 | Gomes et al. | |
| 8,228,638 B1 | 7/2012 | Wielenga | |
| 9,583,125 B1 * | 2/2017 | Lazatin | G11B 33/1493 |
| 2009/0207528 A1 | 8/2009 | Resh et al. | |

* cited by examiner

*Primary Examiner* — Allen T Cao
(74) *Attorney, Agent, or Firm* — Nixon Peabody LLP

(57) ABSTRACT

A suspension baseplate is stamped at its distal end to which the load beam is mounted. The stamping operation smoothes out roughness in the edge of the baseplate and lowers its height slightly so that, along the line on the baseplate which last contacts the load beam as the load beam is leaving the baseplate, that line on the baseplate is smooth and free of burrs and similar defects. By eliminating burrs on the surface to which the load beam is mounted, variations in the pitch and twist of the load beam are reduced.

19 Claims, 4 Drawing Sheets

DISK DRIVE SUSPENSION HAVING STAMPED BASE PLATE DISTAL TIP

CROSS-REFERENCE TO RELATED APPLICATIONS

This application claims priority from U.S. Provisional Patent Application No. 62/152,930 filed Apr. 26, 2015, the disclosure of which is incorporated by reference as if set forth fully herein.

BACKGROUND OF THE INVENTION

1. Field of the Invention

This invention relates to the field of suspensions for disk drives. More particularly, this invention relates to the field of a disk drive suspension whose baseplate has a stamped distal tip.

2. Description of Related Art

Magnetic hard disk drives and other types of spinning media drives such as optical disk drives are well known. Hard disk drives generally include a spinning magnetic disk containing a pattern of magnetic ones and zeroes on it that constitutes the data stored on the disk drive, as well as a disk drive suspension to which a magnetic head slider is mounted proximate a distal end of the load beam. FIG. 1 shows a generalized dual stage actuated (DSA) hard disk drive suspension 10 including a baseplate or mount plate 20, one or two PZT microactuators 14, a load beam 30 including a spring or hinge portion 32 and a beam portion 34, and a flexure gimbal assembly 36 to which a head slider (not shown) carrying a read/write transducer head is attached at the distal end of the beam portion. The read/write head writes data to, and reads data from, the data medium which is a spinning magnetic disk drive, or possibly optical medium in an optical disk drive. Baseplate 20 includes both a mounting portion 21 which is mounted to an actuator arm (not shown) via swage hub 28, and a distal tip 22 to which the hinge 32 is typically spot welded at weld points 38. Typically hinge 32 is formed integrally with beam portion 34, so typically load beam 30 is understood to include spring 32. However, spring 32 and beam portion 34 can be formed separately and then welded together. A number of structural variations from the generalized construction shown in FIG. 1 are possible.

FIG. 2 is an oblique view of a the baseplate 20 of FIG. 1. Baseplate 20 is typically die cut or otherwise cut in a metal cutting operation from a relatively thick stainless steel plate. In contrast, hinge 32, beam portion 34, and the stainless steel portion of flexure gimbal assembly 36 are usually etched from thin sheets of stainless steel.

In standard suspension terminology and as used herein, the term "proximal" means closest or closer to the end of the suspension which is mounted to the actuator arm; in contrast, the term "distal" means closest or closer to the cantilevered end of the suspension, i.e., the end of the suspension that is opposite the actuator arm.

SUMMARY OF THE INVENTION

Die cutting and other metal cutting technologies inevitably produce certain types of defects and irregularities at cut edges, such as burrs, dents, rounding, and other irregularly shaped features. Such irregularities in cut edges will be collectively referred to herein and in the appended claims as "burrs" for simplicity of discussion. FIG. 3 is a closeup of the area of baseplate 20 indicated in FIG. 2 at the distal end of baseplate 20, with the burrs 25 that result from the metal cutting operation shown in exaggerated form. These burrs 25 can cause the load beam 30 to twist or adopt an initial angle that is out of specification or renders the completed suspension unable to meet its final twist or angle specification without an additional adjusting step. The distal tip 22 of baseplate 20 is thus an important part of the suspension assembly, because it affects the starting twist angle of load beam 30.

These defects that are artifacts of the metal cutting operation can be largely eliminated, or their effects on the suspension eliminated or at least ameliorated, by stamping or coining the distal tip 22 of the baseplate tip before mounting load beam 30 to the tip 22, such that the last portion of the baseplate tip 22 that load beam 30 touches before it leaves the baseplate 20 is a relatively clean, smooth, and burr-free stamped line. Coining is a process that causes the baseplate material, which is stainless steel in most cases, to be compressed and to flow slightly. The stamped shelf is significantly smoother, flatter, and more free of the burrs that are artifacts of the metal cutting process by which the baseplate was formed, than are other edges which have not been stamped. Stamping or coining the distal tip of the baseplate thus helps to eliminate or at least greatly reduce burrs, and thus helps to eliminate one source of variability in the final load beam twist or initial angle, thus making the manufacturing process more precise, repeatable, and reliable. If burrs occur at the cut edge, the coining separates that cut edge from contact with the load beam. Any burrs on that cut edge do not touch the load beam, and thus do not affect the assembly of the suspension and its final shape. The line of departure of the load beam from the mount plate is defined by the coining, not by the cut edge. This increases the accuracy of the suspension and decreases the need for after-assembly adjusting such as by mechanical or laser adjusting of the pitch static attitude (PSA) of the suspension.

In one aspect, therefore, the invention is of a suspension for a disk drive in which the load beam is stamped or coined at its distal tip thus forming a stamped or coined shelf in the distal tip baseplate. The stamped shelf includes an edge thereof which defines a line of departure where the load beam leave the baseplate.

DETAILED DESCRIPTION OF THE PREFERRED EMBODIMENTS

Figure 1:
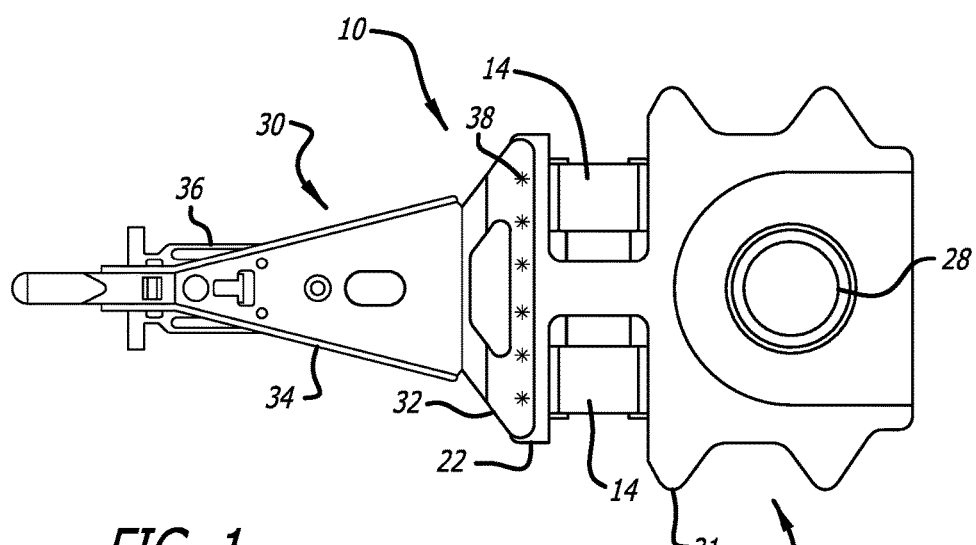
FIG. 1 is a top plan view of a generalized dual stage actuated (DSA) hard disk drive suspension according to the prior art.
Figure 2:
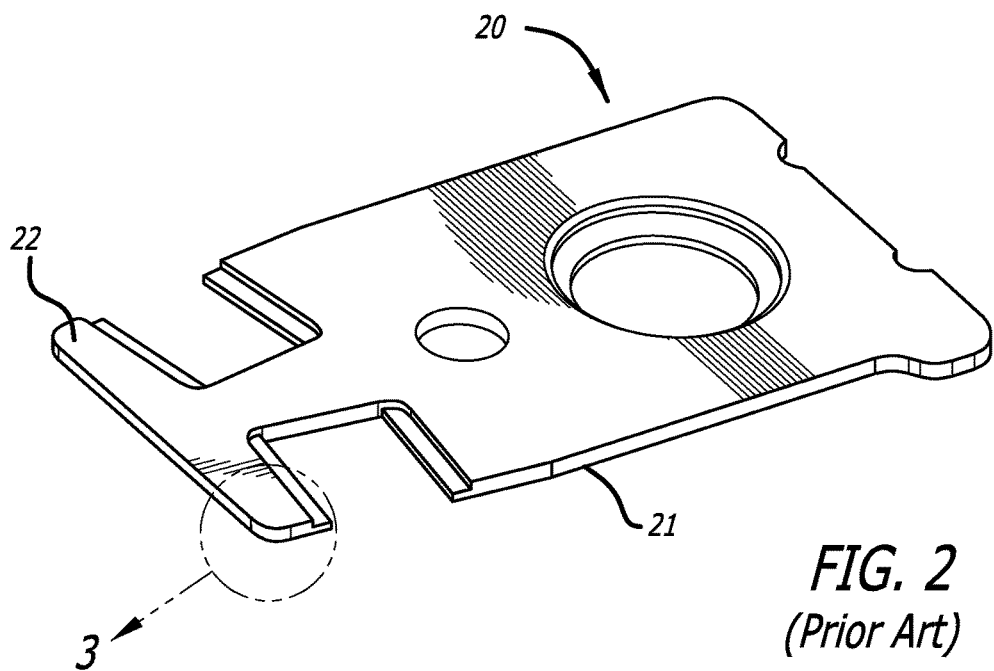
FIG. 2 is an oblique view of a the baseplate of FIG. 1.
Figure 3:
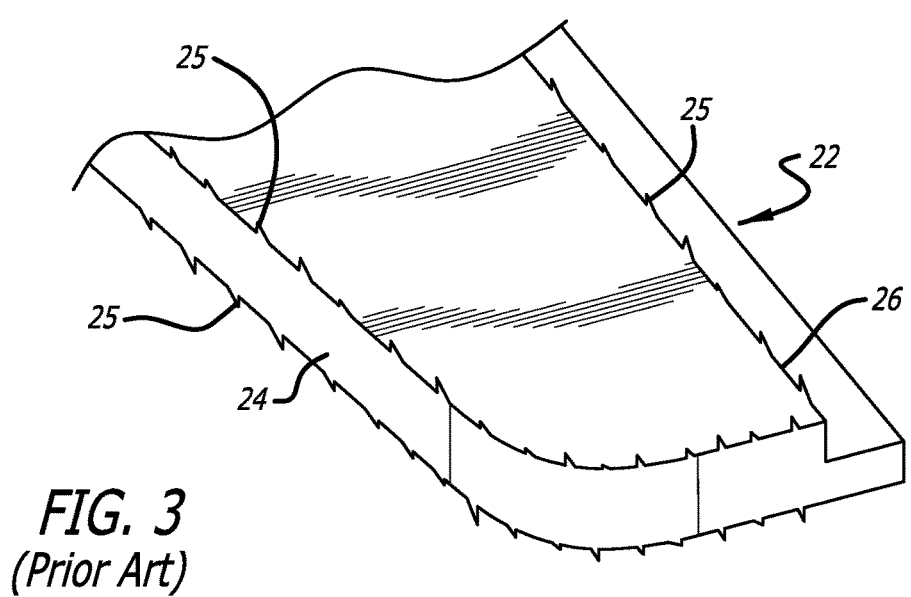
FIG. 3 is a closeup of the baseplate area indicated in FIG. 2 at the distal end of the baseplate, with the burrs that result from the metal cutting operation shown in exaggerated form.
Figure 4:
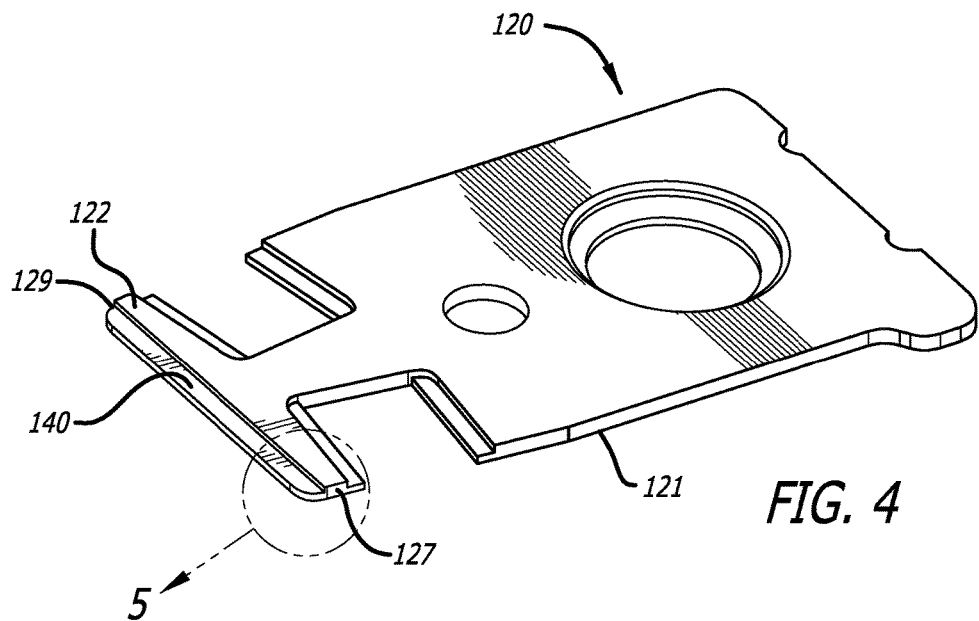
FIG. 4 is an oblique view of a baseplate after the distal edge has been stamped according to an embodiment of the invention.

FIG. 4 is an oblique view of a baseplate 120 according to an embodiment of the invention after the distal tip or end 122 at the distal edge of has been stamped. The distal tip 122 is distal of mounting portion 121 which is mounted to the disk drive assembly's actuator arm via the swage hub. The stamping produces a flat stamped or coined region 140 that defines a smooth and relatively burr-free stamped shelf 128 formed in tip 122. Preferably stamped shelf 140 extends all the way from one lateral end 127 of tip 122 to the opposite lateral end 129. The coined region 140 defines an edge 142 on which the load beam will be mounted. Preferably an entire lateral width of load beam at spring region 32 extends at last partially over the stamped portion 140 of the baseplate along a line at which load beam 30 last makes contact with baseplate 20.

Figure 5:
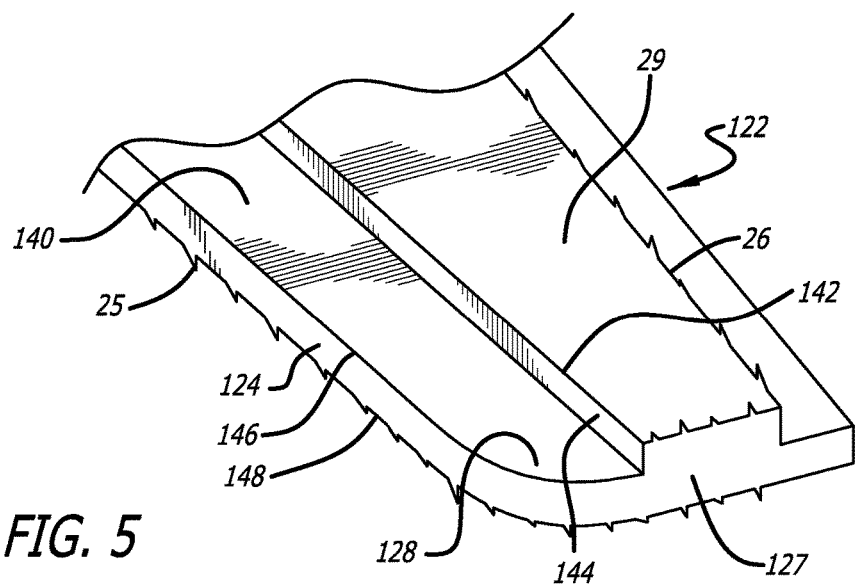
FIG. 5 is a closeup of the baseplate area indicated in FIG. 4 at the stamped distal end of the baseplate, with the burrs that result from the metal cutting operation shown in exaggerated form.

FIG. 5 is a closeup of the area of baseplate 120 indicated in FIG. 4 at the stamped distal tip 122 of the baseplate 120, with the burrs 25 that result from the metal cutting operation performed on cut edges 26 shown in exaggerated form. Lip 144 begins at edge 142 of the coined region 140. A stamped edge 146 at a distal end of the stamped shelf 128 defines a coined distal edge of baseplate 120. Top edge 142 of lip 144 defines a line of departure where spring region 32 last touches baseplate 120 as it extends distally therefrom and over the coined region 140. The stamping operation has rendered top edge 142 substantially free of burrs 25, or at least substantially smoother and flatter than corresponding bottom edge 148 which lies directly below edge 146 and which still has burrs 25 due to the metal cutting operation. Similarly, edges 142 and 146 are substantially smoother and flatter than other cut edges such as edge 26 that have not been stamped.

As utilized herein, terms such as "about," "substantially," and "approximately" are intended to allow some leeway in mathematical exactness to account for tolerances that are acceptable in the trade, or that would otherwise encompass a functionally equivalent variation. Accordingly, any deviations upward or downward from any value modified by such terms should be considered to be explicitly within the scope of the stated value.

Figure 6:
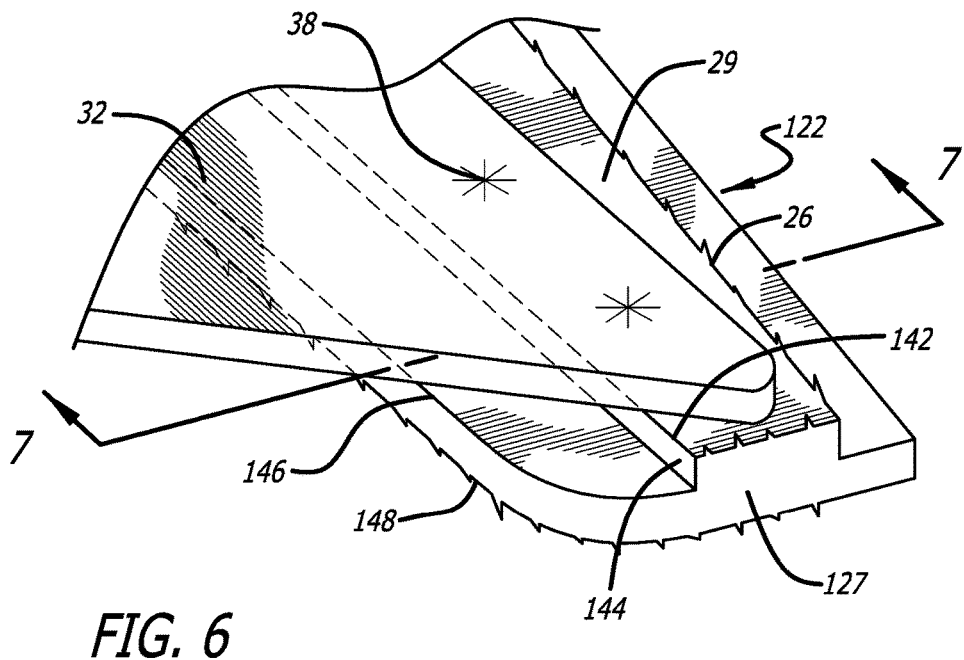
FIG. 6 illustrates the area of the baseplate shown in FIG. 5, but also including a load beam mounted on the baseplate, with the load beam shown in phantom.

FIG. 6 illustrates the area of the baseplate 120 shown in FIG. 5, but also including a spring region 32 of load beam 30 mounted on the baseplate, with spring region 32 shown in phantom. Spring region 32 is laser spot welded to baseplate at weld points 38. Top edge 142 defines a line of departure where spring region 32 leaves distal tip 122 of baseplate 120. The load beam extends at least partially over the coined region 140 of the baseplate.

Figure 7:
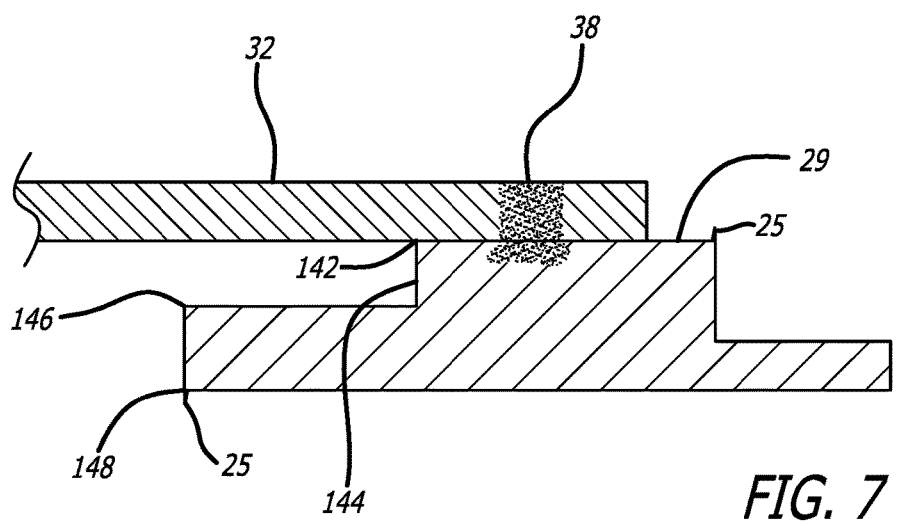
FIG. 7 is a side elevation view of the baseplate and load beam of FIG. 6.

FIG. 7 is a side elevation view of the baseplate and load beam of FIG. 6.

In a preferred embodiment the stamping is performed to a depth of 5-35% of the thickness of the baseplate 112, such that the stamped region will have a thickness of 65-95% a nominal thickness of the baseplate, such as measured at an unstamped region adjacent the stamped region or at the mounting region 121 of the baseplate. For a typical baseplate of 0.150 mm thickness, the stamping would typically be performed to a depth of 0.010 mm to 0.050 mm. The position of stamped line 142 can be located just as accurately as cut edge 26. Since stamped line 142 will be free of burrs, the stamping operation has allowed the twist and initial angle of the load beam 30 to be more accurately controlled, thus reducing the need for PSA adjust before the suspension is ready to be mounted to the actuator arm.

In another embodiment the load beam may be mounted on stamped shelf 128 rather than on top surface 29 of the baseplate, and the stamping is of a uniform depth such that the lateral halves, i.e., both the right and left halves, of spring 32 are at equal heights. That is, a first lateral half of the load beam is mounted on a first lateral half of the stamped shelf, and a second lateral half of the load beam opposite the first half thereof is mounted on a second lateral half of the stamped shelf, and first and second lateral halves of the stamped shelf being stamped to substantially equal depths such that the first and second lateral halves of the load beam lie at substantially equal heights. In another embodiment, only one half, for example, the right half, of a baseplate could be stamped so as to intentionally introduce a vertical offset in one load beam spring relative to the other, for reasons of reducing track misregistration as disclosed in U.S. Pat. No. 7,280,316 to McCaslin et al. and assigned to the assignee of the present application. In another embodiment, both the right and left halves of the baseplate are stamped, but to different depths, also in order to intentionally introduce a vertical offset.

The foregoing figures illustrate the invention as applied to a baseplate 120 in which PZT microactuators are mounted. The invention is also applicable to suspensions in which the baseplates do not have PZT microactuators mounted to them for moving a distal end of the baseplate, such as is the case for suspensions which are not DSA suspensions, or suspensions in which the PZT microactuator(s) used to effect fine movements of the head slider are mounted somewhere other than on the baseplate, such as on the load beam or at the gimbal.

More generally, the invention is applicable to any part of a suspension in which it is desirable and advantageous to make smoother a rough edge, such as for example but not necessarily a die cut metal edge. Such a rough edge can be made smoother be stamping a portion of the part that includes the rough edge, such as by stamping a small shelf or ledge into the part, or stamping a slightly rounded or angled portion into the part. The smoothing created by the stamping helps to not only eliminate small mechanical variations in alignment when one part is mounted to the now-stamped part, but also helps to reduce the possibility of small metal particles being fretted or dislodged during operation where a formerly rough (before stamping) portion of a part contacts another part, especially one that moves slightly during operation.

I claim:

1. A suspension for a disk drive, comprising:
   a baseplate for mounting the suspension to an actuator arm; and
   a load beam mounted to the baseplate, the load beam supporting a read/write head for reading data from, and writing data to, a data storage medium;
   wherein the baseplate has a stamped portion thereof that was created by a stamping operation, the stamped portion defines a flat surface that lies vertically below a location at which the load beam is mounted to the baseplate, and the load beam is mounted to the baseplate such that the load beam extends at least partially over the stamped portion of the baseplate.

2. The suspension of claim 1 wherein the baseplate was formed from a sheet of metal by a cutting operation that left the baseplate with burrs at cut edges of the baseplate.

3. The suspension of claim 1 wherein the load beam comprises a beam portion and a hinge portion, and the hinge portion is mounted on the baseplate.

4. The suspension of claim 1 wherein the baseplate stamped portion extends all the way from a first lateral side of the baseplate to a second and opposite lateral side thereof.

5. The suspension of claim 1 wherein an entire lateral width of the load beam extends at least partially over the stamped portion of the baseplate along a line at which the load beam last makes contact with the baseplate.

6. The suspension of claim 1 wherein the stamping is performed to a depth of between 5 and 35% of a nominal thickness of the baseplate.

7. The suspension of claim 1 wherein the stamping is performed at a distal tip of the baseplate.

8. A suspension for a disk drive, comprising:
   a baseplate for mounting the suspension to an actuator arm, the baseplate comprising a baseplate material;
   a load beam mounted to the baseplate, the load beam supporting a read/write head for reading data from, and writing data to, a data disk;
   wherein at a departure line on the baseplate where the load beam ceases to make contact with the baseplate, the baseplate has a stamped region in which the baseplate material was stamped thus causing the baseplate material to be compressed and to flow.

9. The suspension of claim 8 wherein the stamped region defines a flat surface above which the load beam is mounted thereby reducing variability in angular alignment between the baseplate and at least part of the load beam.

10. The suspension of claim 8 wherein:
    the load beam comprises a beam portion and a spring portion;
    the spring portion is mounted on the baseplate; and
    an entire width of the spring portion extends along the departure line.

11. The suspension of claim 8 wherein:
    the stamped region of the baseplate defines a stamped shelf, the stamped shelf including the departure line; and
    a spring region of the load beam is mounted above the stamped shelf.

12. The suspension of claim 8 wherein:
    the stamped region of the baseplate defines a stamped shelf, the stamped shelf including the departure line; and
    a spring region of the load beam is mounted to the stamped shelf.

13. The suspension of claim 11 wherein:
    the departure line on the baseplate is substantially flatter than any other non-stamped edge of the baseplate.

14. A suspension for a disk drive, comprising:
    a baseplate for mounting the suspension to an actuator arm; and
    a load beam mounted to the baseplate, the load beam supporting a read/write head for reading data from, and writing data to, a data storage medium;
    wherein:
    the baseplate has a stamped shelf formed therein at a distal region of the baseplate;
    a boundary of the stamped shelf defines a stamped edge thereof;
    the load beam is mounted on the stamped edge; and
    the baseplate has at least one cut edge that is that is rougher than the stamped edge.

15. The suspension of claim 14 wherein the stamped edge is substantially smoother than the cut edge.

16. The suspension of claim 14 wherein the stamped edge is located at a top surface of the baseplate, and the cut edge is located on the baseplate below the stamped edge.

17. The suspension of claim 14 wherein the stamped shelf has a depth that is between 5 and 35% of a thickness of the baseplate.

18. The suspension of claim 14 wherein the cut edge has burrs thereon, and any burrs on the stamped edge are substantially smaller than the burrs on the cut edge.

19. A method of manufacturing a suspension for a disk drive, the method comprising:
    cutting a baseplate from a sheet of metal;
    stamping a distal tip of the baseplate to produce a flat coined region thereof, the coined region including a coined edge;
    mounting a load beam to the baseplate such that the load beam extends over the coined region, the coined edge defining a line of departure where the load beam leaves the baseplate.

* * * * *